DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 18, 1970

877 O.G. 490

T877,007

IONOMER FILM STRUCTURE HAVING IMPROVED SLIP AND GLOSS PROPERTIES

Russell T. Uhline 2216 Rio Grande St., Orange, Tex. 77630

Filed Jan. 30, 1970, Ser. No. 7,229

**Int. Cl. C08f *45/44***

U.S. Cl. 260—32.6

No Drawing. 6 Pages Specification

A film structure of an ionic copolymer is provided which is characterized by improved gloss and slip properties; the ionic copolymer includes between about 1% and about 3%, by weight based upon the weight of the ionic copolymer, of N,N′-ethylene-bis-oleamide, and between about 0.1% and about 0.5%, by weight based upon the weight of the ionic copolymer, of a siliceous material having an average particle size of between about 0.1 and about 10 microns. The improved ionic copolymer film structure is characterized by a 20° Gardner gloss of between about 70 and about 80. The improved ionic copolymer film structure is useful for packaging uses.